United States Patent
Henry et al.

(10) Patent No.: US 12,452,452 B2
(45) Date of Patent: Oct. 21, 2025

(54) METHODS AND DEVICES FOR CODING AND DECODING A MULTI-VIEW VIDEO SEQUENCE

(71) Applicant: ORANGE, Issy-les-Moulineaux (FR)

(72) Inventors: Félix Henry, Chatillon (FR); Joël Jung, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 81 days.

(21) Appl. No.: 17/919,642

(22) PCT Filed: Mar. 29, 2021

(86) PCT No.: PCT/FR2021/050551
§ 371 (c)(1),
(2) Date: Oct. 18, 2022

(87) PCT Pub. No.: WO2021/214395
PCT Pub. Date: Oct. 28, 2021

(65) Prior Publication Data
US 2023/0164352 A1  May 25, 2023

(30) Foreign Application Priority Data

Apr. 22, 2020 (FR) ...................................... 2003994

(51) Int. Cl.
*H04N 19/597* (2014.01)
*H04N 19/176* (2014.01)
(Continued)

(52) U.S. Cl.
CPC ......... *H04N 19/597* (2014.11); *H04N 19/176* (2014.11); *H04N 19/59* (2014.11); *H04N 19/70* (2014.11)

(58) Field of Classification Search
None
See application file for complete search history.

(56) References Cited

U.S. PATENT DOCUMENTS

2009/0232212 A1  9/2009  Amon
2013/0218531 A1*  8/2013  Deichmann ............... A61C 5/77
703/1
(Continued)

FOREIGN PATENT DOCUMENTS

| EP | 2755388 A1 | 7/2014 |
|---|---|---|
| JP | 2022517118 A | 3/2022 |
| JP | 2022532302 A | 7/2022 |

OTHER PUBLICATIONS

English translation of the Written Opinion of the International Searching Authority dated Jul. 8, 2021 for corresponding International Application No. PCT/FR2021/050551, filed Mar. 29, 2021.
(Continued)

*Primary Examiner* — Clifford Hilaire
(74) *Attorney, Agent, or Firm* — David D. Brush; Westman, Champlin & Koehler, P.A.

(57) ABSTRACT

Methods for coding and decoding a coded data stream representative of a multi-view video. The coded data stream includes data representative of at least one atlas, which corresponds to an image having at least one patch. The at least one patch corresponds to a set of pixels extracted from at least one component of a view of the multi-view video, the view not being coded in the coded data stream. The method for decoding includes decoding, from the coded data stream, the at least one atlas, including decoding the at least one patch, determining, for the decoded patch, whether a transformation, and which transformation, must be applied to the decoded patch, the transformation belonging to the group including at least one oversampling of the patch or a modification of the pixel values of the patch, and applying the determined transformation to the decoded patch.

11 Claims, 3 Drawing Sheets

(51) Int. Cl.
  *H04N 19/59* (2014.01)
  *H04N 19/70* (2014.01)

(56) References Cited

U.S. PATENT DOCUMENTS

| | | | |
|---|---|---|---|
| 2016/0234492 A1 | 8/2016 | Li et al. | |
| 2016/0316215 A1* | 10/2016 | Minoo | H04N 19/176 |
| 2020/0219290 A1* | 7/2020 | Tourapis | H04N 19/597 |
| 2021/0005016 A1* | 1/2021 | Oh | G06T 9/001 |
| 2021/0006830 A1* | 1/2021 | Yun | H04N 19/176 |
| 2021/0337237 A1 | 10/2021 | Zakharchenko et al. | |
| 2022/0159298 A1* | 5/2022 | Boyce | H04N 19/70 |
| 2022/0353532 A1* | 11/2022 | Zakharchenko | H04N 19/597 |

OTHER PUBLICATIONS

Lou J et al., "Motorola Mobility's adaptive interpolation filter", 96. MPEG Meeting; Mar. 21, 2011-Mar. 25, 2011; Geneva; (Motion Picture Expert Group or ISO/IEC JTC1/SC29/WG11), No. m19888, Mar. 16, 2011 (Mar. 16, 2011), XP030048455.

Murinto et al., "Image enhancement using piecewise linear contrast stretch methods based on unsharp masking algorithms for leather image processing", Oct. 25, 2017 (Oct. 25, 2017), p. 669-673, XP033296949.

Arici T et al., "A Histogram Modification Framework and Its Application for Image Contrast Enhancement", IEEE Transactions on Image Processing, IEE Service Center, PISCATAWAY, NJ, US, vol. 18, No. 9, Sep. 1, 2009 (Sep. 1, 2009), p. 1921-1935, XP011268498.

Basel Salahieh et al., "Test Model 4 for Immersive Video", ISO/IEC JTC 1/SC 29/WG 11 N19002, Brussels, BE—Jan. 2020.

International Search Report dated Jun. 28, 2021 for corresponding International Application No. PCT/FR2021/050551, filed Mar. 29, 2021.

Written Opinion of the International Searching Authority dated Jun. 28, 2021 for corresponding International Application No. PCT/FR2021/050551, filed Mar. 29, 2021.

Video, "Working Draft 3 of Metadata for Immersive Video", Vol ties/16, Jan. 13, 2020 (Jan. 13, 2020), p. 1-49, ITU-T Draft; Study Period 2017-2020; Study Group 16, International Telecommunication Union, Geneva; CH, Retrieved from the Internet: URL:https://www.itu.int/ifa/t/2017/sg16/docs/200622/td/ties/gen/T17SG16-200622-TD-GEN-0444!A6!ZIP-E.zip MIV_WD3_clean.docx, XP044281540.

H. Karim et al, "Scalable multiple description video coding for stereoscopic 3D", IEEE Transactions on Consumer Electronics, vol. 54, No. 2, May 1, 2008 (May 1, 2008), p. 745-752, XP055065376.

Japanese Notice of Reasons for Refusal dated Jan. 28, 2025 for corresponding Japanese Application No. 2022-564436.

* cited by examiner

METHODS AND DEVICES FOR CODING AND DECODING A MULTI-VIEW VIDEO SEQUENCE

CROSS-REFERENCE TO RELATED APPLICATIONS

This Application is a Section 371 National Stage Application of International Application No. PCT/FR2021/050551, filed Mar. 29, 2021, which is incorporated by reference in its entirety and published as WO 2021/214395 A1 on Oct. 28, 2021, not in English.

1. FIELD OF THE INVENTION

The invention relates to immersive videos, representative of a scene captured by one or more cameras. More particularly, the invention relates to the coding and decoding of such videos.

2. PRIOR ART

In an immersive video context, i.e. where the viewer has the feeling of being immersed in the scene, the scene is typically captured by a set of cameras, as illustrated in FIG. 1. These cameras can be of type 2D (cameras $C_1$, $C_2$, $C_3$, $C_4$ in FIG. 1) or of type 360, i.e. capturing the entire scene 360 degrees around the camera (camera $C_5$ in FIG. 1).

All of these captured views are traditionally coded and then decoded by a terminal of the viewer. However, in order to provide a sufficient quality of experience, and thus a visual quality and a good immersion in the scene displayed to the viewer, displaying only the captured views is insufficient.

In order to improve the feeling of immersion in the scene, usually one or more views, referred to as intermediate views, are calculated from the decoded views.

These intermediate views can be calculated by a view synthesis algorithm.

Typically, for example in the MIV system (Metadata for Immersive Video) currently being standardised, not all the original views, i.e. those captured by cameras, are transmitted to the decoder. A selection, also called "pruning", of data from at least some of the original views, which can be used to synthesise an intermediate viewpoint, is made.

FIG. 2 illustrates an example of a coding-decoding system using such a data selection of the multi-view video to synthesise intermediate views on the decoder side.

According to this method, one or more basic views ($T_b$, $D_b$ in FIG. 2) are coded by a 2D encoder, for example an HEVC encoder, or by a multi-view encoder.

The other views ($T_s$, $D_s$) are processed to extract certain zones from each of these views. The extracted zones, hereinafter also called patches, are collected in images called atlases. The atlases are coded for example by a conventional 2D video encoder, for example a HEVC encoder. On the decoder side, the atlases are decoded, providing the decoded patches to the view synthesis algorithm to produce intermediate views from the basic views and the decoded patches. Overall, the patches allow the same zone to be transmitted from another viewpoint. In particular, patches allow the transmission of occlusions, i.e. parts of the scene that are not visible from a given view.

The MIV system (MPEG-I part 12) in its reference implementation (TMIV for "Test Model for Immersive Video") generates atlases formed by a set of patches.

FIG. 3 shows an example of extracting patches (Patch2, Patch5, Patch8, Patch3, Patch7) from views ($V_0$, $V_1$, $V_2$) and creating associated atlases, for example two atlases $A_0$ and $A_1$. These atlases $A_0$ and $A_1$ each comprise a texture image $T_0$, $T_1$ and a corresponding depth map $D_0$, $D_1$. Atlas $A_0$ has a texture $T_0$ and a depth $D_0$, and Atlas $A_1$ has a texture $T_1$ and a depth $D_1$. As explained in FIG. 2, the patches are collected into images and coded by a conventional 2D video encoder. In order to avoid the extra signaling and coding costs of the extracted patches, it is necessary to have an optimum arrangement of the patches in the atlases. Furthermore, given the large amount of information to process by the decoder to reconstruct views of a multi-view video, it is necessary not only to reduce the cost of compressing such patches, but also the number of pixels that the decoder needs to process. Indeed, in most applications, the devices for playing such videos have more limited resources than the devices for coding such videos.

There is therefore a need to improve the prior art.

3. SUMMARY OF THE INVENTION

The invention improves the state of the art. To this end, it relates to a method for decoding a coded data stream representative of a multi-view video, said coded data stream comprising coded data representative of at least one atlas, said at least one atlas corresponding to an image comprising at least one patch, said at least one patch corresponding to a set of pixels extracted from at least one component of a view of the multi-view video, said view not being coded in said coded data stream. The decoding method comprises:
  decoding, from said coded data stream, said at least one atlas, including the decoding of said at least one patch,
  determining, for said at least one decoded patch, whether a transformation, and which transformation, must be applied to said at least one decoded patch, said transformation belonging to the group of transformations comprising at least one oversampling of the patch or a modification of the pixel values of the patch,
  applying the determined transformation to said decoded patch.

Correlatively, the invention also relates to a method for coding a data stream representative of a multi-view video, the coding method comprises:
  extracting from at least one component of a view of the multi-view video not coded in said data stream, at least one patch corresponding to a set of pixels of said component,
  determining, for said at least one extracted patch, whether a transformation, and which transformation must be applied to said at least one patch, said transformation belonging to the group of transformations comprising at least one sub-sampling of the patch or a modification of the pixel values of the patch,
  applying the determined transformation to said at least one patch,
  coding at least one atlas in said data stream, said at least one atlas corresponding to an image comprising at least said at least one patch.

Thanks to the invention, it is thus possible to identify which patches of a decoded atlas must be transformed during reconstruction. Such a transformation corresponds to the inverse transformation of the one applied during the coding of the atlas.

The invention can also apply transformations to patches of an atlas that are different from one patch to the other, or that may have different parameters.

The arrangement of patches in an atlas is thus optimised for compression. Indeed, the transformations used for the patches of the atlas can, on the one hand, optimise the occupancy rate of the pixels of the atlas, by using transformations such as rotation, sub-sampling and coding so as to arrange the patches within the atlas image.

On the other hand, the transformations can optimise the cost of compressing patches, in particular by modifying the pixel values of these patches, for example by reducing the dynamic range of the pixels, by sub-sampling, which leads to coding fewer pixels, or by using an optimum arrangement of the patches in the image of the atlas enabling the fewest possible pixels to code to be obtained. The reduction in the occupancy rate of the pixels of the atlas also reduces the rate of pixels to be processed by the decoder, and thus reduces the complexity of the decoding.

According to a particular embodiment of the invention, it is determined whether a transformation must be applied to said at least one decoded patch from at least one syntax element decoded from said coded data stream for said at least one patch. According to this particular embodiment of the invention, a syntax element is explicitly coded in the data stream to indicate whether a transformation, and which transformation must be applied to the decoded patch.

According to another particular embodiment of the invention, said at least one decoded syntax element comprises at least one indicator indicating whether a transformation must be applied to said at least one patch and if the indicator indicates that a transformation must be applied to said at least one patch, said at least one syntax element optionally comprises at least one parameter of said transformation. According to this particular embodiment of the invention, the transformation to be applied to the patch is coded in the form of an indicator indicating whether or not a transformation must be applied to the patch, and in the positive case, possibly the parameter or parameters of the transformation to apply. For example, a binary indicator can indicate whether a transformation must be applied to the patch, and if so, a code indicating which transformation is used, and possibly one or more parameters of the transformation, such as scale factor, modification function of the pixel dynamic range, rotation angle, etc.

In other embodiments, the parameters of the transformation can be set by default at the encoder.

According to another particular embodiment of the invention, said at least one parameter of said transformation to apply to said patch has a value that is predictively coded with respect to a prediction value. This particular embodiment of the invention can thus save on the signaling cost of the parameters of the transformation.

According to another particular embodiment of the invention, the prediction value is coded in a header of a view, or of a component of the atlas or of the atlas.

According to another particular embodiment of the invention, the prediction value corresponds to the value of a parameter of a transformation applied to a patch belonging to the group comprising:
 a previously processed patch according to a processing order of the patches of the atlas,
 a previously processed patch extracted from the same component of a view of the multi-view video as the one to which the at least one patch belongs,
 a patch selected from a set of candidate patches using an index coded in said data stream,
 a patch selected from a set of candidate patches using a criterion.

According to another particular embodiment of the invention, the determination, for said at least one decoded patch, whether a transformation must be applied to said at least one decoded patch, is performed if a syntax element decoded from a header of the data stream indicates an activation of the application of transformations to the patches coded in the data stream, said syntax element being coded in a header of a view or of a component of a view or of said atlas. According to this particular embodiment of the invention, a high-level syntax element is coded in the data stream to signal the use of transformations to apply to the patches of the multi-view video. Thus, the additional cost generated by the coding of the parameters of the transformations at the patch level is avoided when these transformations are not used. In addition, this particular embodiment of the invention can limit the complexity of the decoding when these transformations are not used.

According to another particular embodiment of the invention, it is determined that a transformation must be applied to said at least one decoded patch if a characteristic of said decoded patch meets a criterion. According to this particular embodiment of the invention, the indication of the use of a transformation to apply to the patch is not explicitly coded in the data stream. Such an indication is inferred from a feature of the decoded patch. This particular embodiment of the invention can use patch transformations without involving additional coding costs to signal the use of transformations.

According to another particular embodiment of the invention, the characteristic corresponds to a ratio $R=H/W$ where H corresponds to a height and W corresponds to a width of said at least one decoded patch, the transformation to be applied to said at least one patch corresponding to a vertical oversampling by a predetermined factor when said ratio is comprised within a determined interval. According to this particular mode of implementation of the invention, it is thus possible to mix in the same atlas "long" patches for which it is not interesting to do a sub-sampling and "long" patches for which a sub-sampling is carried out without needing to signal it.

According to another particular mode of implementation of the invention, the characteristic corresponds to an energy E calculated from the value of the pixels of said at least one decoded patch, the transformation to be applied to said at least one patch corresponding to a multiplication of the value of said pixels by a determined factor, when the energy E is lower than a threshold.

According to another particular embodiment of the invention, when several transformations must be applied to a same patch, an order in which said transformations must be applied is predefined. In this particular embodiment of the invention, no signaling is required to indicate the order in which the transformations are applied. This order is defined at the encoder and decoder and remains the same for all the patches to which these transformations apply.

The invention also relates to a device for decoding a coded data stream representative of a multi-view video, said coded data stream comprising coded data representative of at least one atlas, said at least one atlas corresponding to an image comprising at least one patch, said at least one patch corresponding to a set of pixels extracted from at least one component of a view of the multi-view video, said view not being coded in said coded data stream, the decoding device comprising a processor and a memory configured for:
 decoding, from said coded data stream, said at least one atlas, including decoding said at least one patch, determining, for said at least one decoded patch, whether a transformation, and which transformation must be applied to said at least one decoded patch, said transformation belonging to the group comprising at least one oversampling of the patch or a modification of the pixel values of the patch, applying the determined transformation to said decoded patch.

According to a particular embodiment of the invention, such a device is comprised in a terminal.

The invention also relates a device for coding a data stream representative of a multi-view video, comprising a processor and a memory configured for:

extracting from at least one component of a view of the multi-view video not coded in said data stream, at least one patch corresponding to a set of pixels of said component, determining, for said at least one extracted patch, whether a transformation, and which transformation must be applied to said at least one patch, said transformation belonging to the group of transformations comprising at least one sub-sampling of the patch or a modification of the pixel values of the patch, applying the determined transformation to said at least one patch, coding at least one atlas in said data stream, said at least one atlas corresponding to an image comprising at least said at least one patch.

According to a particular embodiment of the invention, such a device is comprised in a terminal.

The coding method, and respectively the decoding method according to the invention can be implemented in various ways, notably in wired form or in software form. According to a particular embodiment of the invention, the coding method, respectively the decoding method, is implemented by a computer program. The invention also relates to a computer program comprising instructions for implementing the coding method or the decoding method according to any one of the particular embodiments previously described, when said program is executed by a processor. Such a program can use any programming language. It can be downloaded from a communication network and/or recorded on a computer-readable medium.

This program can use any programming language, and can be in the form of source code, object code, or intermediate code between source code and object code, such as in a partially compiled form, or in any other desirable form.

The invention also relates to a computer-readable storage medium or data medium comprising instructions of a computer program as mentioned above. The recording media mentioned above can be any entity or device able to store the program. For example, the medium can comprise a storage means, such as a ROM, for example a CD-ROM or a microelectronic circuit ROM, a USB flash drive, or a magnetic recording means, for example a hard drive. On the other hand, the recording media can correspond to a transmissible medium such as an electrical or optical signal, that can be carried via an electrical or optical cable, by radio or by other means. The program according to the invention can be downloaded in particular on an Internet-type network.

Alternatively, the recording media can correspond to an integrated circuit in which the program is embedded, the circuit being adapted to execute or to be used in the execution of the method in question.

4. LIST OF FIGURES

Other characteristics and advantages of the invention will emerge more clearly upon reading the following description of a particular embodiment, provided as a simple illustrative non-restrictive example, and the annexed drawings, wherein:

FIG. 1 diagrammatically illustrates an example of a multi-view scene capture system.

FIG. 2 diagrammatically illustrates an example of a multi-view encoder based on the coding of patches.

5. DESCRIPTION OF AN EMBODIMENT OF THE INVENTION

Figure 4:
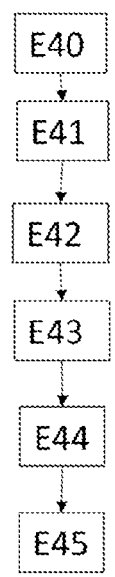
FIG. 4 illustrates steps of a coding method according to a particular embodiment of the invention.

FIG. 4 illustrates steps of a multi-view video coding method in at least one coded data stream according to a particular embodiment of the invention.

Figure 2:
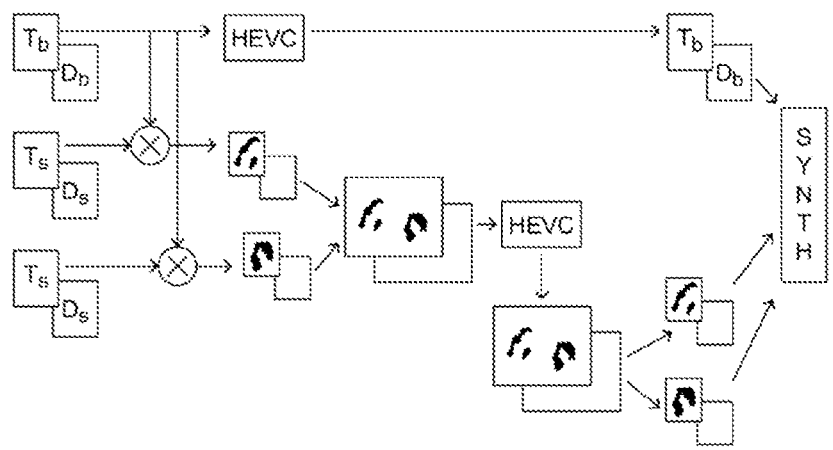
Figure 3:
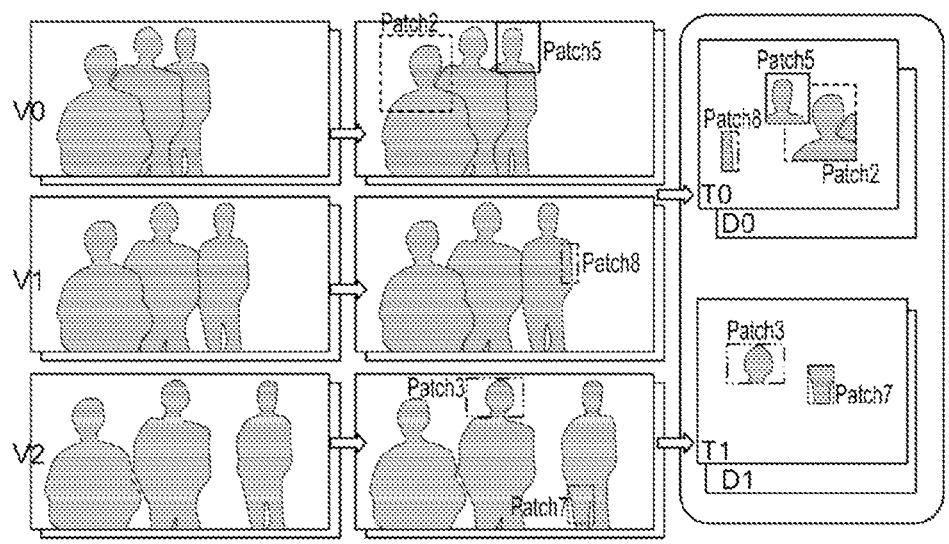
FIG. 3 shows an example of patch extraction and atlas creation.

According to the invention, the multi-view video is coded according to a coding scheme as shown in relation to FIG. 2 wherein one or more basic views are coded in the data stream and wherein sub-image or patches comprising texture and depth data are also coded in the data stream. These patches come from additional views that are not fully encoded in the data stream. Such patches and one or more basic views allow the decoder to synthesise other views of the scene, also called virtual views, or synthesised views or even intermediate views hereinafter. These synthesised views have not been coded in the data stream. The steps of such a coding scheme relating to a particular embodiment of the invention are described below.

Figure 1:
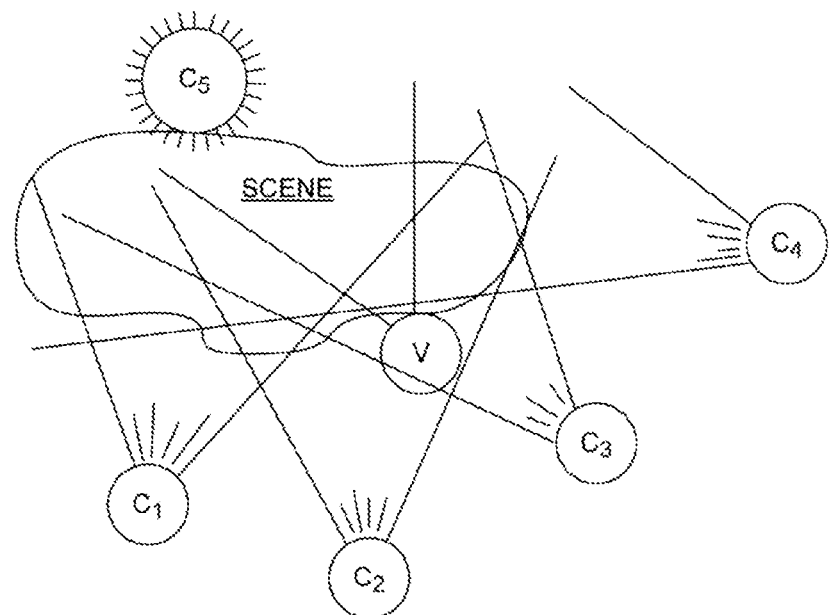

For example, it is considered here that the scene is captured by a set of cameras $C_1, C_2, \ldots, C_N$ as shown in FIG. 1. Each camera generates a view, including at least one so-called texture component that varies over time. In other words, the texture component of a view is a sequence of 2D images corresponding to the images captured by the camera placed at the viewpoint of the view. Each view also includes a depth component, called a depth map, which is determined for each image in the view.

The depth map can be generated in a known way by estimating depth using texture, or by capturing volumetric data from the scene using Light detection and Ranging (Lidar) technology. Hereafter, the term "view" will be used to indicate a sequence of texture images and depth maps representative of the scene captured from a viewpoint. By abuse of language, the term "view" can also mean a texture image and a depth map of a view at a given time.

When the views of the multi-view video are captured, the encoder then proceeds with the steps that are described below, for example according to the coding scheme defined in Basel Salahieh, Bart Kroon, Joel Jung, Marek Domański, *Test Model 4 for Immersive Video, ISO/IEC JTC 1/SC 29/WG 11 N19002*, Brussels, BE—January 2020.

In a step E40, one or more basic views are selected from the captured views of the multi-view video.

The basic views are selected from the set of captured views of the multi-view video in known ways. For example, spatial sub-sampling can be done to select every one view out of two. In another example, the content of the views can be used to determine which views are to be retained as base views. In yet another example, camera parameters (position, orientation, focus) can be used to determine the views that must be selected as basic views. At the end of step E40, a certain number of views are selected to be basic views.

The other views, not selected as basic views, are called "additional views".

In a step E41, a pruning method is applied to the additional views to identify for each additional view one or more patches to be transmitted to the decoder. This step determines the patches to be transmitted by extracting, from the additional view images, the zones required for intermediate view synthesis. For example, such zones correspond to occlusion zones not visible in the basic views, or visible zones that have undergone a change in illumination, or have a lower quality in the basic views. The extracted zones are of arbitrary size and shape.

A clustering of pixels connected to their neighbours is performed to create one or more rectangular patches from the extracted zones of a same view that are easier to code and arrange.

In a step E42, for each patch, the encoder determines one or more transformations that will be applied to the patch when it is arranged in an atlas.

It is recalled that the patches can be patches with a texture component and/or a depth component.

The patches are arranged in the atlases so as to minimise the coding cost of the atlases and/or reduce the number of pixels to be processed by the decoder. To achieve this, patches can undergo transformations, including:
- Sub-sampling by a factor Nv in the vertical dimension
- Sub-sampling by a factor of Nh in the horizontal dimension
- Sub-sampling by a factor of Ne in each dimension
- Modification of the pixel values contained in the patch
- Rotate the patch by an angle $i*90°$ where $i=0, 1, 2$ or 3.

The encoder then runs through each patch and determines one or more transformations to apply to the patch.

In one variant, an "identity" transformation, in other words, no transformations, may also be included in the list of transformations to be tested for the patch.

The selection of a transformation from among the possible transformations can be made by evaluating a rate-distortion criterion calculated on the reconstructed signal using the rate required to encode the transformed patch and the distortion calculated between the original patch and the coded then reconstructed transformed patch. The selection can also be made based on the assessment of the quality of the additional view synthesised using the patch being processed.

For each transformation, one or more parameters can be tested.

For example, in the case of sub-sampling, different factors Nv, Nh and Ne can be tested. In a preferred embodiment, the factors Nv, Nh and Ne are equal to 2. In other embodiments, other values are possible, such as 4, 8 or 16.

The transformation corresponding to a change in pixel values is also called a "mapping". Such a mapping transformation can for example consist of dividing all the pixel values of the patch by a given value Dv. For example, Dv is equal to 2. However, other values are possible, such as 4, 8 or 16.

In another example, the mapping can also consist in transforming the x-values of the pixels into new y-values using a parameterised function $f_P(x)=y$. Such a function is, for example, a linear function per part, each part being parameterised by its starting abscissa x1, and the parameters a and b of the linear function $y=ax+b$. The parameter P of the transformation is then a triplet list (x1, a, b) for each linear part of the mapping.

In another example, the mapping can also be a LookUp Table (LUT) which is a table associating a value y with an input x.

For the rotation transformation, it can be a 180° vertical rotation, also known as a vertical flip. Other rotation parameters values can also be tested, for example angle values defined by $i*90°$ where $i=0, 1, 2$ or 3.

The determination of a transformation associated with a patch can also take into account the number of atlases available to encode the multi-view video and simulate the arrangement of patches in the atlases in order to optimise the rate/distortion cost of encoding the atlases or the quality of the intermediate view synthesis globally.

At the end of step E42, a list of transformed patches is available. Each patch is associated with the transformation(s) determined for that patch and the associated parameters.

During step E43, the patches are arranged in one or more atlases. The number of atlases depends, for example, on parameters defined as input to the encoder, such as the size of an atlas (length and height) and the maximum number M of pixels for the texture and depth of all atlases per given time or image. This maximum number M corresponds to the number of pixels to be processed by the decoder for one time of the multi-view video.

In the particular embodiment described here, each basic view is considered to be coded in an atlas comprising a patch comprising a texture component and a depth component of the basic view at a given time. In this particular embodiment, there are as many atlases as there are basic views and as many atlases as are needed to transport all the patches extracted from the additional views.

Depending on the size of the atlases given as input, an atlas may consist of a basic view and patches, or a basic view may be split and represented on several atlases if the view size is larger than the atlas size.

According to the particular embodiment described here, a patch of an atlas may then correspond to an entire image of a basic view or to a part of a basic view or to a zone extracted from an additional view.

The texture pixels of the patches are arranged in the texture component of an atlas and the depth pixels of the patches are arranged in the depth component of an atlas.

An atlas can comprise only one texture or depth component, or comprise a texture and a depth component. In other examples, an atlas can also comprise other types of component comprising useful information for the intermediate view synthesis. For example, other types of components may include information such as a reflectance index, to indicate how transparent the corresponding zone is, or confidence information about the depth value at that location.

During step E43, the encoder scans all patches in the patch list. For each patch, the encoder determines in which atlas this patch will be coded. This list includes both transformed and untransformed patches. Untransformed patches are either patches comprising zones extracted from additional views that have undergone no transformation or an identity transformation, or patches comprising images of basic views. It is considered here that when the patch must be transformed, it has already been transformed.

An atlas is a set of spatially rearranged patches in an image. This image is intended to be coded. The purpose of this arrangement is to make the best use of the space in the atlas images to code. Indeed, one of the objectives of video coding is to minimise the number of pixels to be decoded before a view can be synthesised. For this, the patches are arranged in the atlases in such a way that the number of patches in an atlas is maximised. Such a method is described in Basel Salahieh, Bart Kroon, Joel Jung, Marek Domański, *Test Model 4 for Immersive Video, ISO/IEC JTC 1/SC 29/WG 11 N19002*, Brussels, BE—January 2020.

Following step E43, a list of patches for each atlas is generated. It should be noted that this arrangement also determines the number of atlases to be coded for a given time.

During step E44, the atlases are coded in the data stream. In this step, each atlas, which includes a texture component and/or a depth component in the form of a 2D image, is coded using a conventional video encoder such as HEVC, VVC, MV-HEVC, 3D-HEVC, etc. As explained above, the basic views are considered here as patches. The coding of atlases therefore involves the coding of basic views.

During step E45, the information associated with each atlas is coded in the data stream. This information is typically coded by an entropic encoder.

For each atlas, the list of patches includes the following items for each patch in the list:
 The location of the patch in the atlas in the form of 2D coordinates, e.g. the position of the top left corner of the rectangle representing the patch,
 The location of the patch in its original view, in the form of 2D coordinates, i.e. its position in the image of the view from which it was extracted, e.g. the position in the image of the top left corner of the rectangle representing the patch,
 The dimensions of the patch (length and height),
 An identifier of the original view of the patch,
 Information on the transformation applied to the patch.

In step E45, for at least several patches of the atlas, information about the transformations to be applied to the patch during decoding is coded in the data stream. The transformations to apply to the patch during decoding correspond to the inverse transformations applied to the patch when arranging the patch of the atlas and determined above.

In a particular embodiment of the invention, for each patch, information indicating the transformation to be applied is transmitted.

In the particular embodiment described here, it is considered that it is the transformation to be applied to the decoding that is indicated and not the transformation applied to the encoding (corresponding to the inverse transformation of the decoding). For example, when sub-sampling is applied during encoding, oversampling is applied during decoding. It is clearly understood that in other particular embodiments of the invention, the information transmitted on the transformation to apply may correspond to information indicating the transformation applied to the coding, the decoder then deducing the transformation to be applied from this information.

For example, the information indicating the transformation to be applied can be an index indicating the transformation to be applied in a list of possible transformations. Such a list may further include an identity transformation. In the case where no transformation is applied to the patch, an index indicating the identity transformation can thus be coded.

In another embodiment, a binary indicator may be coded to indicate whether or not the patch is transformed, and if the binary indicator indicates that the patch has been transformed, an index indicating which transformation to apply from the list of possible transformations is coded.

In an embodiment where only one transformation to apply is possible, only the binary indicator can be coded to indicate whether or not the patch is transformed.

The list of possible transformations can be known to the decoder and therefore does not need to be transmitted in the data stream. In other embodiments, the list of possible transformations may be coded in the data stream, for example in a header of a view or of the multi-view video. The parameters associated with the transformations to be applied can also be defined by default and known to the decoder. In another particular embodiment of the invention, the parameters associated with a transformation applied to the patch are encoded in the data stream for each patch.

When the transformation corresponds to an oversampling in one or both dimensions (equivalent to an identical sub-sampling during the coding), the parameter associated with the transformation can correspond to a value of an interpolation to be applied for all dimensions or a value of an interpolation to apply for each dimension.

When the transformation corresponds to a modification of the pixel values of the patch to code, by mapping using a parameter, the parameters of this transformation correspond to the characteristics of the mapping to apply: parameters of a linear function, linear by parts, Look-up Table (LUT), etc. In particular, the possible LUT(s) can be known to the decoder.

When the transformation corresponds to a rotation, the parameter corresponds to the angle of rotation selected among the possible rotations.

The parameters associated with a transformation can be coded as is or by prediction against a prediction value.

In one embodiment according to a variant, in order to predict the value of a parameter, a prediction value can be defined and coded in the data stream in a header of a view, or a component, or an image of a view, or even an atlas comprising the current patch.

Thus, for a given atlas, the value P of a parameter will be predicted by a value Ppred coded at the level of the atlas. The difference between Ppred and P is then coded for each patch of the atlas.

In another embodiment, to predict the value of the parameter, the prediction value Ppred may correspond to the value of the parameter used for a previously processed patch. For example, it could be the previous patch in the patch processing order, or the previous patch belonging to the same view as the current patch.

The prediction value of the parameter can also be obtained by a mechanism similar to the "Merge" mode of a HEVC encoder. For each patch, a list of candidate patches is defined and an index pointing to one of these candidate patches is coded for the patch.

In another embodiment, an index need not be transmitted, as a criterion can be used to identify the patch from the list of candidate patches. Hence, for example, the patch that maximises a measure of similarity to the current patch can be chosen, or even the patch whose dimensions are closest to the current patch can be chosen.

In other embodiment variants, the information indicating whether the patch must undergo a transformation may be decomposed into a part that indicates the usage of the transformation (e.g. a binary indicator) and a part that indicates the parameters of the transformation, if the usage is enabled. This signaling mechanism can be used independently for each possible transformation for the patch.

In a particular embodiment of the invention, a binary indicator can be coded at the level of a header of an atlas, or a view or a component, to activate the use of a determined transformation for the patches of that atlas, that view or that component. The application of the determined transformation for a patch then depends on the value of this binary indicator.

For example, two binary indicators $I_A$ and $I_B$ associated respectively with the activation of a transformation A and the activation of a transformation B are coded in a header of an atlas. The value of the binary indicator $I_A$ indicates that the use of transformation A is possible, while the value of the binary indicator $I_B$ indicates that the use of transformation B is not possible. In this example, for each patch, a binary indicator will show whether the transformation A is applied to the patch, and possibly the associated parameters. It is not necessary in this example to code a binary indicator for each patch to indicate whether the transformation B is applied to the patch.

The particular embodiment activating the use of a transformation at the patch level or at a higher level makes can, in particular, save on the cost of signaling, when no patch uses this transformation.

If this binary activation indicator is coded at the level of a view or component, then its value applies to all the patches belonging to the view or component regardless of the atlas in which the patch is coded. Thus, an atlas can include a patch for which a certain transformation can be applied according to the indicator coded for that patch and a patch for which the same transformation cannot be applied. For this latter patch, no indicator for this transformation is encoded in the patch information.

In another particular embodiment of the invention, no information indicating a transformation is encoded at the patch level. This is deduced at the decoder from a characteristic of the patch. The transformation is then applied to the patch as soon as it meets a certain criterion. This particular mode will be described in more detail below in relation to the decoding process.

Figure 5:
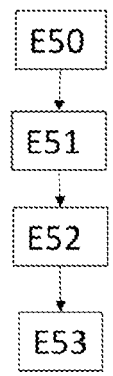
FIG. 5 illustrates steps of a decoding method according to a particular embodiment of the invention.

FIG. 5 illustrates steps of a method for decoding a coded data stream representative of a multi-view video according to a particular embodiment of the invention. For example, the coded data stream was generated by the coding method described in relation to FIG. 4.

During a step E50, the atlas information is decoded. This information is typically decoded by a suitable entropic decoder.

They include a list of patches, and for each patch, the following elements:
  The location of the patch in the atlas in the form of coordinates,
  The location of the patch in its original view, in the form of coordinates,
  The dimensions of the patch,
  An identifier of the original view of the patch,
  Information indicating whether a transformation must be applied to the patch.

As in the coding method, this information can be an index indicating a transformation from a list of possible transformations, or for each possible transformation, an indicator indicating whether the transformation must be applied to the patch.

For a transformation corresponding to identical oversampling in both dimensions, the information can be a binary indicator indicating the use of the transformation or a value of an interpolation to apply for all dimensions.

For a transformation corresponding to a distinct oversampling in the two dimensions, the information may correspond to a binary indicator indicating the use of the transformation or for each of the dimensions a value of an interpolation to apply.

For a transformation corresponding to a modification of the pixel of the patch to decode, by mapping using a parameter, the information can comprise an information item indicating the use of the mapping, and possibly information representative of the characteristics of the mapping to apply (parameters of a linear function, linear by parts, Look-up Table, etc.).

For a transformation corresponding to a rotation, the parameter will indicate what rotation was selected among the possible rotations.

The information transmitted can identify a transformation to be applied to the patch is decoded in a manner appropriate to the coding applied. Thus, it can be decoded as is (direct decoding) or predictively, in a similar manner to the encoder.

According to a particular embodiment of the invention, the information for identifying a transformation to be applied to the patch can comprise a part that indicates the use of the transformation (binary indicator) and a part that indicates the parameters of the transformation, if the use is activated.

As for the coding method, according to a particular embodiment of the invention, the decoding for a given patch, of an item of information identifying a transformation to apply to the patch can depend on an activation binary indicator coded in the header of the atlas, of the view or of the component to which the patch belongs.

According to another particular embodiment of the invention, the information identifying a transformation to be applied to the patch is not coded with the patch information, but derived from the characteristics of the decoded patch.

For example, in one embodiment, the energy of the decoded pixels in the patch is measured, by calculating the root mean square error of the patch. If this energy is below a given threshold, for example, a root mean square error of less than 100, the pixel values of the patch are transformed by multiplying all the values of the patch by a specified factor Dv. For example Dv=2. Other threshold values are possible, as well as other patch value modification factors.

According to another variant, if the ratio of the H/W decoded dimensions of the patch, with H being the height of the patch and W the length of the patch, is within a given range, for example 0.75<H/W<1.5, then the patch is interpolated by a given factor, for example a factor 2 in the vertical dimension. The patch dimensions considered here are the patch dimensions decoded from the atlas information in which the patch was coded. These are the dimensions of the patch before transformation to the decoder (and hence after transformation to the encoder).

When it is determined that the H/W ratio is within the determined range, the patch is oversampled and its dimensions recalculated consequently.

This variant makes it possible to mix in the same atlas "long" patches for which it is not interesting to do a sub-sampling and "long" patches for which sub-sampling is done without signaling, which makes them respect the criterion that allows them to be interpolated at the decoder. Other threshold values can be used, for example more restrictive values such as 0.9<H/W<1.1.

During a step E51, the components of the atlases are decoded. Each atlas, which includes a 2D texture component and/or a 2D depth component, is decoded using a conventional video decoder such as AVC or HEVC, VVC, MV-HEVC, 3D-HEVC, etc.

During a step E52, the decoded patches are reconstructed by applying the transformation identified in step E50 to the texture component and/or the depth component of each patch in its atlas depending on whether the transformation applies to texture, depth or both components.

For additional views, this step consists of modifying each patch individually by applying the transformation identified for this patch. This can be done in a number of ways, for example: by modifying the pixels of the patch in the atlas that contains it, by copying the modified patch into a buffer memory zone, or by copying the transformed patch into its associated view.

Depending on the previously decoded information, each patch to reconstruct can have one of the following transformations applied:
  Sub-sampling by a factor Nv in the vertical dimension,
  Sub-sampling by a factor Nh in the horizontal dimension,
  Sub-sampling by a factor Ne in each dimension,
  Modification of the pixel values contained in the patch,
  Rotation of the patch.

The modification of the pixel values is similar to the coding and decoding. Note that the transmitted mapping parameters can either be the parameters of the encoder mapping (and then the decoder must apply the inverse function of the mapping) or the parameters of the decoder mapping (and then the encoder must apply the inverse function of the mapping).

According to a particular embodiment of the invention, it is possible to apply to the encoder several transformations to a patch. These transformations are signaled in the stream in the information coded for the patch or else deduced from the characteristics of the decoded patch. For example, the encoder can be sub-sampled by a factor of 2 in each dimension of the patch, followed by a mapping of the pixel values of the patch, and then a rotation.

According to this particular embodiment of the invention, the order of the transformations to apply is predefined and known to the encoder and the decoder. For example, the order is as follows at the encoder: rotation, then sub-sampling, then mapping.

When reconstructing the patch at the decoder, when several transformations must be applied to the patch, the reverse order is applied to the patch (mapping, oversampling, then rotation). Thus, both the decoder and the encoder know in which order to apply the transformations in order to produce the same result.

At the end of step E52, a set of reconstructed patches is available.

During a step E53, at least one intermediate view is synthesised using at least one basic view and at least one previously reconstructed patch. The virtual view synthesis algorithm chosen is applied to the decoded and reconstructed data of the multi-view video that has been transmitted to the decoder. As explained earlier, this algorithm relies on the pixels of the basic and patch view components to produce a view from a viewpoint between the cameras.

For example, the synthesis algorithm uses at least two textures and two depth maps from basic views and/or additional views to generate an intermediate view. The synthesisers are known and belong, for example, to the DIBR category (Depth Image Based Rendering). For example, algorithms frequently used by standards organisations are:
  VSRS for View Synthesis Reference Software, initiated by Nagoya University and enhanced by MPEG, applies forward projections of depth maps using homography between the reference views and the intermediate views, followed by a filling step to remove forward warping artefacts;
  RVS for Reference View Synthesizer, initiated by the University of Brussels and improved by Philips, starts by projecting the reference views using a calculated disparity. The references are partitioned into triangles, and distorted. Then the deformed views of each reference are blended and a basic inpainting filling is applied to fill the dis-occlusions;
  VVS for Versatile View Synthesizer, developed by Orange, sorts the references, applies a deformation of certain depth map information, and then conditionally merges these depths. Then a backward warping of the textures is applied, followed by a merging of the different textures and depths. Finally, a spatio-temporal inpainting is applied, before spatial filtering of the intermediate image.

Figure 6:
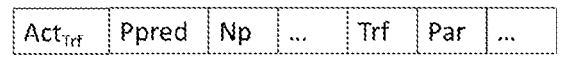
FIG. 6 illustrates a data stream example according to a particular embodiment of the invention.

FIG. 6 illustrates an example of a data stream according to a particular embodiment of the invention and notably the atlas information coded in the stream and used to identify one or more transformations to apply to the patches of the atlas. For example, the data stream has been generated by the coding method according to any one of the particular embodiments described in relation to FIG. 4, and is suitable to be decoded by the decoding method according to any one of the particular embodiments described in relation to FIG. 5.

According to this particular embodiment of the invention, such a stream notably comprises:
  an $Act_{Trf}$ indicator coded in the header of the atlas to indicate whether or not the given transformation is activated,
  a prediction value Ppred to serve as a prediction value for the transformation parameter value,
  a number Np of coded patches in the atlas,
  for each patch of the atlas, the patch information and notably a Trf indicator showing whether or not the transformation is used for the patch,
  when the Trf indicator indicates the use of the transformation for the patch, a parameter Par of the transformation, for example in the form of a residue obtained with respect to the prediction value Ppred, where this is coded.

As explained in relation to the coding and decoding methods described above, further particular embodiments of the invention are possible in terms of the transformation-related information that is coded for the patches.

Figure 7:
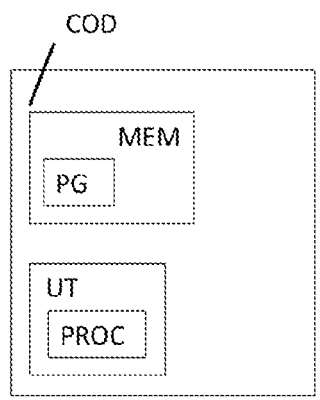
FIG. 7 illustrates an example of the architecture of a coding device according to a particular embodiment of the invention.

FIG. 7 shows the simplified structure of a coding device COD adapted to implement the coding method according to any one of the particular embodiments of the invention.

According to a particular embodiment of the invention, the steps of the coding method are implemented by computer program instructions. For this purpose, the coding device COD has the standard architecture of a computer and notably comprises a memory MEM, a processing unit UT, equipped for example with a processor PROC, and driven by the computer program PG stored in the memory MEM. The computer program PG comprises instructions for implementing the steps of the coding method as described above, when the program is executed by the processor PROC.

At initialisation, the code instructions of the computer program PG are for example loaded into a RAM memory (not shown) before being executed by the processor PROC. In particular, the processor PROC of the processing unit UT implements the steps of the coding method described above, according to the instructions of the computer program PG.

Figure 8:
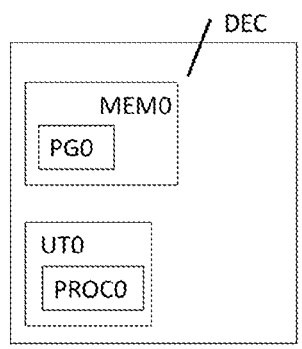
FIG. 8 illustrates an example of the architecture of a decoding device according to a particular embodiment of the invention.

FIG. 8 shows the simplified structure of a decoding device DEC adapted to implement the decoding method according to any one of the particular embodiments of the invention.

According to a particular embodiment of the invention, the decoding device DEC has the standard architecture of a computer and notably comprises a memory MEM0, a processing unit UT0, equipped for example with a processor PROC0, and driven by the computer program PG0 stored in the memory MEM0. The computer program PG0 comprises instructions for implementing the steps of the decoding method as described above, when the program is executed by the processor PROC0.

At initialisation, the code instructions of the computer program PG0 are for example loaded into a RAM memory (not shown) before being executed by the processor PROC0. In particular, the processor PROC0 of the processing unit UT0 implements the steps of the decoding method described above, according to the instructions of the computer program PG0.

The invention claimed is:

1. A method comprising:
   decoding a coded data stream representative of a multi-view video, said coded data stream comprising coded data representative of at least one atlas, said at least one atlas corresponding to an image comprising at least one patch, said at least one patch corresponding to a set of pixels extracted from at least one component of a view of the multi-view video, said view not being coded in said coded data, the decoding comprising:
   decoding, from said coded data stream, said at least one atlas, including decoding said at least one patch;
   determining, for said at least one decoded patch, whether a transformation, and which transformation must be applied to said at least one decoded patch, said transformation belonging to the group of transformations comprising at least one decoded patch, the modification comprising applying a linear or a linear by parts function to the pixel values, the determining comprising determining whether the transformation must be applied to said at least one decoded patch from at least one syntax element decoded from said coded data stream for said at least one patch, said at least one decoded syntax element comprising at least one indicator indicating whether the transformation must be applied to said at least one decoded patch and if the indicator indicates that the transformation must be applied to said at least one decoded patch, said at least one syntax element optionally comprises at least one parameter of said transformation, said at least one parameter of said transformation to apply to said at least one decoded patch having a value that is predictively coded with respect to a prediction value, the prediction value corresponding to the value of a parameter of a transformation applied to a patch belonging to a group consisting of:
   a previously processed patch according to a processing order of the patches of the atlas;
   a previously processed patch extracted from the same component of a view of the multi-view video as the component to which the at least one patch belongs;
   a patch selected from a set of candidate patches using an index coded in said data stream; and
   a patch selected from a set of candidate patches using a selection criterion; and
   applying the determined transformation to said at least one decoded patch.

2. The method according to claim 1, wherein the prediction value is coded in a header of a view, or of a component of the atlas or of the atlas.

3. The method according to claim 1, comprising performing the determining, for said at least one decoded patch, whether the transformation must be applied to said at least one decoded patch, if a syntax element decoded from a header of the data stream indicates an activation of an application of transformations to the patches coded in the data stream, said syntax element being coded in a header of a view or of a component of a view or of said atlas.

4. The method according to claim 1, comprises determining that the transformation must be applied to said at least one decoded patch if a characteristic of said decoded patch meets a criterion.

5. The method according to claim 4, wherein the characteristic corresponds to an energy E calculated from the value of the pixels of said at least one decoded patch, the transformation to be applied to said at least one patch corresponding to a multiplication of the value of said pixels by a determined factor, when the energy E is lower than a threshold.

6. A method comprising:
   coding a data stream representative of a multi-view video, wherein the coding comprises:
   extracting from at least one component of a view of the multi-view video not coded in said data stream, at least one patch corresponding to a set of pixels of said component;
   determining, for said at least one extracted patch, whether a transformation, and which transformation must be applied to said at least one extracted patch, said transformation comprising at least a modification of pixel values of the at least one extracted patch, the modification comprising applying a linear or a linear by parts function to the pixel values, the determining comprising determining whether the transformation must be applied to said at least one decoded patch from at least one syntax element decoded from said coded data stream for said at least one patch, said at least one decoded syntax element comprising at least one indicator indicating whether the transformation must be applied to said at least one decoded patch and if the indicator indicates that the transformation must be applied to said at least one decoded patch, said at least one syntax element optionally comprises at least one parameter of said transformation, said at least one parameter of said transformation to apply to said at least one decoded patch having a value that is predictively coded with respect to a prediction value, the prediction value corresponding to the value of a parameter of a transformation applied to a patch belonging to a group consisting of:
   a previously processed patch according to a processing order of the atlas;

a previously processed patch extracted from the same component of a view of the multi-view video as the component to which the at least one patch belongs;
a patch selected from a set of candidate patches using an index coded in said data stream; and
a patch selected from a set of candidate patches using a selection criterion;
applying the determined transformation to said at least one decoded patch; and
coding at least one atlas in said data stream, said at least one atlas corresponding to an image comprising at least said at least one extracted patch.

7. The method according to claim 1, comprising predefining an order in which several transformations must be applied to a same patch of the at least one extracted patch.

8. A decoding device comprising:
a processor;
a non-transitory computer readable medium comprising instructions stored thereon which when executed by the processor configure the decoding device to decode a coded data stream representative of a multi-view video, said coded data stream comprising coded data representative of at least one atlas, said at least one atlas corresponding to an image comprising at least one patch, said at least one patch corresponding to a set of pixels extracted from at least one component of a view of the multi-view video, said view not being coded in said coded data stream, the decoding comprising:
  decoding, from said coded data stream, said at least one atlas, including decoding said at least one patch;
  determining, for said at least one decoded patch, whether a transformation, and which transformation must be applied to said at least one decoded patch, said transformation comprising at least a modification of pixel values of the at least one decoded patch, the modification comprising applying a linear or a linear by parts function to the pixel values, the determining comprising determining whether the transformation must be applied to said at least one decoded patch from at least one syntax element decoded from said coded data stream for said at least one patch, said at least one decoded syntax element comprising at least one indicator indicating whether the transformation must be applied to said at least one decoded patch and if the indicator indicates that the transformation must be applied to said at least one decoded patch, said at least one syntax element optionally comprises at least one parameter of said transformation, said at least one parameter of said transformation to apply to said at least one decoded patch having a value that is predictively coded with respect to a prediction value, the prediction value corresponding to the value of a parameter of a transformation applied to a patch belonging to a group consisting of:
    a previously processed patch according to a processing order of the patches of the atlas;
    a previously processed patch extracted from the same component of a view of the multi-view video as the component to which the at least one patch belongs;
    a patch selected from a set of candidate patches using an index coded in said data stream; and
    a patch selected from a set of candidate patches using a selection criterion; and
  applying the determined transformation to said at least one decoded patch.

9. A coding device comprising:
a processor;
a non-transitory computer readable medium comprising instructions stored thereon which when executed by the processor configure the coding device to code a data stream representative of a multi-view video, by:
  extracting from at least one component of a view of the multi-view video not coded in said data stream, at least one patch corresponding to a set of pixels of said component;
  determining, for said at least one extracted patch, whether a transformation, and which transformation must be applied to said at least one extracted patch, said transformation comprising at least a modification of pixel values of the at least on extracted patch; the modification comprising applying a linear or a linear by parts function to the pixel values, the determining comprising determining whether the transformation must be applied to said at least one decoded patch from at least one syntax element decoded from said coded data stream for said at least one patch, said at least one decoded syntax element comprising at least one indicator indicating whether the transformation must be applied to said at least one decoded patch and if the indicator indicates that the transformation must be applied to said at least one decoded patch, said at least one syntax element optionally comprises at least one parameter of said transformation, said at least one parameter of said transformation to apply to said at least one decoded patch having a value that is predictively coded with respect to a prediction value, the prediction value corresponding to the value of a parameter of a transformation applied to a patch belonging to a group consisting of:
    a previously processed patch according to a processing order of the patches of the atlas;
    a previously processed patch extracted from the same component of a view of the multi-view video as the component to which the at least one patch belongs;
    a patch selected from a set of candidate patches using an index coded in said data stream; and
    a patch selected from a set of candidate patches using a selection criterion;
  applying the determined transformation to said at least one extracted patch; and
  coding at least one atlas in said data stream, said at least one atlas corresponding to an image comprising at least said at least one patch.

10. A non-transitory computer readable medium comprising instructions stored thereon for decoding a coded data stream representative of a multi-view video, when said instructions are executed by a processor of a decoding device, said coded data stream comprising coded data representative of at least one atlas, said at least one atlas corresponding to an image comprising at least one patch, said at least one patch corresponding to a set of pixels extracted from at least one component of a view of the multi-view video, said view not being coded in said coded data, wherein the decoding comprises:
  decoding, from said coded data stream, said at least one atlas, including decoding said at least one patch;
  determining, for said at least one decoded patch, whether a transformation, and which transformation must be applied to said at least one decoded patch, said transformation comprising at least a modification of pixel values of the at least one decoded patch, the modification comprising applying a linear or a linear by parts function to the pixel values, the determining comprising determining whether the transformation must be applied to said at least one decoded patch from at least one syntax element decoded from said coded data stream for said at least one patch, said at least one decoded syntax element comprising at least one indicator indicating whether the transformation must be applied to said at least one decoded patch and if the indicator indicates that the transformation must be applied to said at least one decoded patch, said at least one syntax element optionally comprises at least one parameter of said transformation, said at least one parameter of said transformation to apply to said at least one decoded patch having a value that is predictively coded with respect to a prediction value, the prediction value corresponding to the value of a parameter of a transformation applied to a patch belonging to a group consisting of:

a previously processed patch according to a processing order of the patches of the atlas;

a previously processed patch extracted from the same component of a view of the multi-view video as the component to which the at least one patch belongs;

a patch selected from a set of candidate patches using an index coded in said data stream; and a patch selected from a set of candidate patches using a selection criterion; and applying the determined transformation to said at least one decoded patch.

11. A non-transitory computer readable medium comprising instructions stored thereon for coding a data stream representative of a multi-view video, when said instructions are executed by a processor of a coding device, wherein the coding comprises:

extracting from at least one component of a view of the multi-view video not coded in said data stream, at least one patch corresponding to a set of pixels of said component;

determining, for said at least one extracted patch, whether a transformation, and which transformation must be applied to said at least one patch, said transformation comprising at least a modification of pixel values of the at least one extracted patch, the modification comprising applying a linear or a linear by parts function to the pixel values, the determining comprising determining whether the transformation must be applied to said at least one decoded patch from at least one syntax element decoded from said coded data stream for said at least one patch, said at least one decoded syntax element comprising at least one indicator indicating whether the transformation must be applied to said at least one decoded patch and if the indicator indicates that the transformation must be applied to said at least one decoded patch, said at least one syntax element optionally comprises at least one parameter of said transformation, said at least one parameter of said transformation to apply to said at least one decoded patch having a value that is predictively coded with respect to a prediction value, the prediction value corresponding to the value of a parameter of a transformation applied to a patch belonging to a group consisting of:

a previously processed patch according to a processing order of the patches of the atlas;

a previously processed patch extracted from the same component of a view of the multi-view video as the component to which the at least one patch belongs;

a patch selected from a set of candidate patches using an index coded in said data stream; and a patch selected from a set of candidate patches using a selection criterion; applying the determined transformation to said at least one extracted patch; and coding at least one atlas in said data stream, said at least one atlas corresponding to an image comprising at least said at least one extracted patch.

* * * * *